United States Patent
Hajiloo et al.

(10) Patent No.: US 12,271,193 B2
(45) Date of Patent: Apr. 8, 2025

(54) ARCHITECTURE AND METHODOLOGY FOR DEFENSIVE AUTONOMOUS DRIVING USING A PROBABILISTIC CONTROL STRATEGY

(71) Applicant: GM Global Technology Operations LLC, Detroit, MI (US)

(72) Inventors: Reza Hajiloo, Waterloo (CA); Seyedalireza Kasaiezadeh Mahabadi, Novi, MI (US); Ehsan Asadi, Markham (CA); Gianmarc Coppola, Richmond Hill (CA); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 277 days.

(21) Appl. No.: 18/151,608

(22) Filed: Jan. 9, 2023

(65) Prior Publication Data

US 2024/0231358 A1    Jul. 11, 2024

(51) Int. Cl.
*G05D 1/00* (2024.01)
*G05D 1/02* (2020.01)
(Continued)

(52) U.S. Cl.
CPC .......... *G05D 1/0088* (2013.01); *G05D 1/0212* (2013.01); *B60W 60/001* (2020.02);
(Continued)

(58) Field of Classification Search
CPC ............... B60W 60/00; B60W 60/001; B60W 60/0011; B60W 60/0015; B60W 60/0016; B60W 60/0017; B60W 60/0018; B60W 60/00182; B60W 60/00184; B60W 60/00186; B60W 60/0027; B60W 60/00272; B60W 60/00274; B60W 60/00276; G05D 2111/60; G05D 2111/67; G01C 21/00; G01C 21/005; G01C 21/12; G01C 21/14; G01C 21/16; G01C 21/165; G01C 21/1652; G01C 21/1654;
(Continued)

(56) References Cited

U.S. PATENT DOCUMENTS

| | | | |
|---|---|---|---|
| 12,060,082 B1 * | 8/2024 | Garimella | ........ B60W 30/18159 |
| 2007/0198222 A1 * | 8/2007 | Schuster | .................. G01D 1/00 |
| | | | 702/182 |

(Continued)

*Primary Examiner* — Russell Frejd
*Assistant Examiner* — Sara J Lewandroski
(74) *Attorney, Agent, or Firm* — Vivacqua Crane, PLLC (57) ABSTRACT

A method for controlling an autonomous vehicle includes receiving road data. The road data includes information about a plurality of potential events along the road ahead of the autonomous vehicle. The method further includes determining, in real time, a probability that the plurality of potential events along the road ahead of the autonomous vehicle will occur while the autonomous vehicle moves along the road and determining, in real time, an adjusted planned path using a probabilistic predictive control that takes into account the probability that the plurality of potential events along the road ahead of the autonomous vehicle will occur. Further, the method includes controlling the autonomous vehicle to cause the autonomous vehicle to autonomously follow the adjusted planned path.

10 Claims, 2 Drawing Sheets

(51) Int. Cl.
    *B60W 60/00*         (2020.01)
    *G01C 21/00*         (2006.01)
    *G01C 21/34*         (2006.01)

(52) U.S. Cl.
    CPC ..... *B60W 60/0011* (2020.02); *B60W 60/0027* (2020.02); *G01C 21/005* (2013.01); *G01C 21/34* (2013.01); *G01C 21/3453* (2013.01)

(58) Field of Classification Search
    CPC .... G01C 21/1656; G01C 21/26; G01C 21/28; G01C 21/34; G01C 21/3407; G01C 21/3415; G01C 21/3453; G01C 21/3492; G01C 21/3691; G01C 21/3815; G01C 21/3819; G01C 21/3822; G01C 21/3833; G01C 21/3848
    See application file for complete search history.

(56) References Cited

U.S. PATENT DOCUMENTS

| | | | | |
|---|---|---|---|---|
| 2016/0349358 | A1* | 12/2016 | Noda | G01S 7/412 |
| 2021/0206379 | A1* | 7/2021 | Bobier-Tiu | B60T 8/17551 |
| 2021/0261123 | A1* | 8/2021 | Wray | B60W 60/001 |
| 2022/0126875 | A1* | 4/2022 | Hammoud | B60W 30/09 |

\* cited by examiner

ARCHITECTURE AND METHODOLOGY FOR DEFENSIVE AUTONOMOUS DRIVING USING A PROBABILISTIC CONTROL STRATEGY

INTRODUCTION

The present disclosure relates to systems and methods for defensive autonomous driving using a probabilistic control strategy.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Current autonomous vehicle control approaches deal with uncertainties with conservative solutions to minimize traffic issues (e.g., obstacles in the middle of the road) under most potential driving scenarios. Vehicle performance, however, may suffer when using conservative solutions. For example, when using conservative control solutions, the autonomous vehicle may drive at relatively lower speeds and/or perform milder steering maneuvers. It is nonetheless desirable to develop an autonomous vehicle control system and method that avoids traffic issues, such as obstacles in the middle of the road, while minimizing vehicle performance issues (e.g., relatively lower speeds and/or perform milder steering maneuvers). To do so, the presently disclosed system and method for defensive autonomous diving monitors the environment around the autonomous vehicle and considers the probabilities of emergency events (or other potential events) and plans ahead of time instead of planning too conservatively by considering the worst-case scenarios. Also, the presently disclosed system and method for defensive autonomous diving commands the autonomous vehicle to react aggressively to emergency events (as opposed to proactive planning) only when the perception system of the autonomous system positively identifies an emergency event.

SUMMARY

In an aspect of the present disclosure, a method for controlling an autonomous vehicle includes receiving road data. The road data includes information about a road ahead of the autonomous vehicle and is at least partly received from a plurality of sensors of the autonomous vehicle. The road data includes information about a plurality of potential events along the road ahead of the autonomous vehicle. The method further includes determining, in real time, a probability that the plurality of potential events along the road ahead of the autonomous vehicle will occur while the autonomous vehicle moves along the road and determining, in real time, an adjusted planned path using a probabilistic predictive control, such as a contingency model predictive control (MPC), that takes into account the probability that the plurality of potential events along the road ahead of the autonomous vehicle will occur. Further, the method includes controlling the autonomous vehicle to cause the autonomous vehicle to autonomously follow the adjusted planned path. The method described in this paragraph improves autonomous vehicle technology by avoiding traffic issues, such as obstacles in the middle of the road, while minimizing vehicle performance issues (e.g., relatively lower speeds and/or perform milder steering maneuvers).

In an aspect of the present disclosure, the method further includes detecting the plurality of potential events along the road ahead of the autonomous vehicle of the autonomous vehicle using the plurality of sensors of the autonomous vehicle. The probability that the plurality of potential events along the road ahead of the autonomous vehicle will occur is a function of a reliability of each of the plurality of sensors that detected the plurality of potential events along the road ahead of the autonomous vehicle.

In an aspect of the present disclosure, the method further determining a plurality of control actions using the probabilistic predictive control to follow the adjusted planned path of the autonomous vehicle and commanding the autonomous vehicle to perform the control actions to follow the adjusted planned path of the autonomous vehicle.

In an aspect of the present disclosure, the method further fusing sensor data of the plurality of sensors to determine the probability that the plurality of potential events along the road ahead of the autonomous vehicle will occur. The probability that the plurality of potential events along the road ahead of the autonomous vehicle will occur is determined using the following equation:

$$P_1 = \frac{(R_{1A}^c P_{1A} + R_{1B}^c P_{1B})}{R_{1A}^c + R_{1B}^c}$$

where:
$P_1$ is the probability that a detected event of the plurality of potential events along the road ahead of the autonomous vehicle will occur;
$R_{1A}$ is a reliability of a first sensor of the plurality of sensors;
$R_{1B}$ is a reliability of a second sensor of the plurality of sensors;
$P_{1A}$ is the probability that the detected event of the plurality of potential events along the road ahead of the autonomous vehicle will occur as detected by the first sensor;
$P_{1B}$ is the probability that the detected event of the plurality of potential events along the road ahead of the autonomous vehicle will occur as detected by the second sensor; and
c is a predetermined constant.

In an aspect of the present disclosure, the probabilistic predictive control includes a vehicle prediction model and an optimizer. The vehicle prediction model uses a planar bicycle model.

In an aspect of the present disclosure, the optimizer uses an objective function to optimize the plurality of control actions.

In an aspect of the present disclosure, the objective function includes a tracking weight for each of a plurality of predicted paths. The tracking weight for each of the plurality of predicted paths is multiplied by the probability that the plurality of potential events will occur along the road ahead of the autonomous vehicle.

In an aspect of the present disclosure, the optimizer is constrained by control action constraints, control action slew rate constraints, yaw rate stability constraints, sideslip stability constraints, and lateral deviations constraints.

The present disclosure also describes a tangible, non-transitory, machine-readable medium, including machine-readable instructions, that when executed by one or more processors, cause one or more processors to execute the methods described above.

The present disclosure also describes a system including a plurality of sensors and a controller in communication with the plurality of sensors. The controller is programmed to execute the methods described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

Figure 1:
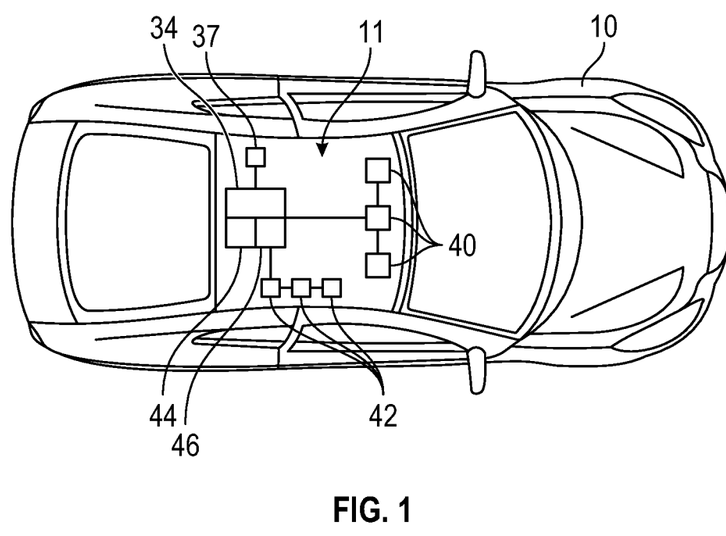
FIG. 1 is a schematic top view of a vehicle including a system for defensive autonomous driving using a probabilistic control strategy.
Figure 2:
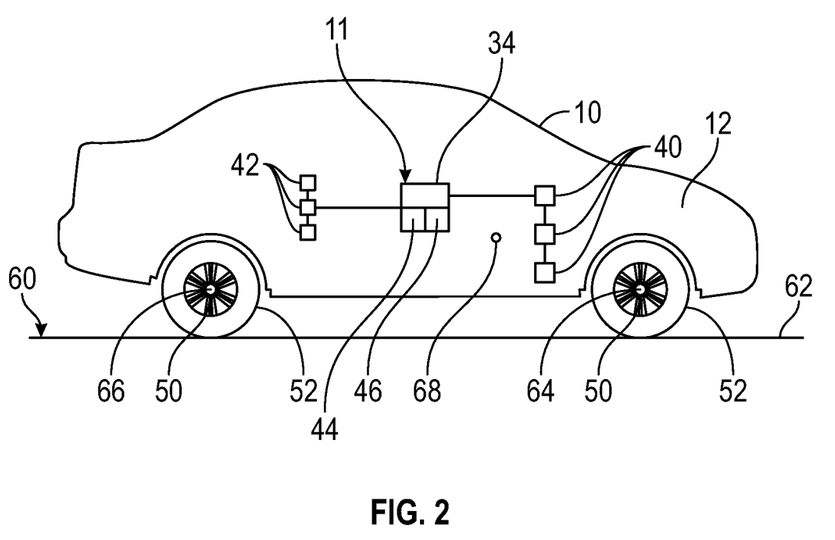
FIG. 2 is a schematic side view of the vehicle of FIG. 1.

With reference to FIGS. 1 and 2, an autonomous vehicle 10 includes (or is in communication with) a system 11 for defensive autonomous driving control. While the system 11 is shown inside the autonomous vehicle 10, it is contemplated that the system 11 may be outside of the autonomous vehicle 10. As a non-limiting example, the system 11 may be a cloud-based system in wireless communication with the autonomous vehicle 10. Although the autonomous vehicle 10 is shown as a sedan, it is envisioned that that autonomous vehicle 10 may be another type of vehicle, such as a pickup truck, a coupe, a sport utility vehicle (SUVs), a recreational vehicle (RVs), etc. The autonomous vehicle 10 is configured to drive autonomously.

The autonomous vehicle 10 includes a controller 34 and one or more sensors 40 in communication with the controller 34. The sensors 40 collect information and generate sensor data indicative of the collected information. As non-limiting examples, the sensors 40 may include Global Navigation Satellite System (GNSS) transceivers or receivers, yaw rate sensors, speed sensors, lidars, radars, ultrasonic sensors, and cameras, among others. The GNSS transceivers or receivers are configured to detect the location of the autonomous vehicle 10 in the globe. The speed sensors are configured to detect the speed of the autonomous vehicle 10. The yaw rate sensors are configured to determine the heading of the autonomous vehicle 10. The cameras may have a field of view large enough to capture images in front, in the rear, and in the sides of the autonomous vehicle 10. The ultrasonic sensor may detect stationary or dynamic objects.

The system 11 further includes a controller 34 in communication with the sensors 40. The controller 34 includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the autonomous vehicle 10.

Figure 3:
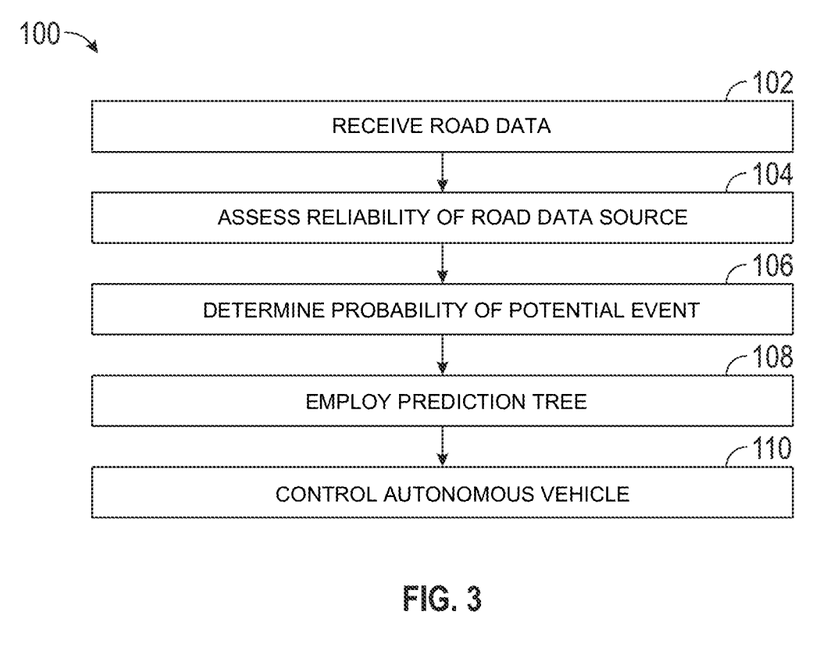
FIG. 3 is a flowchart of a method for defensive autonomous driving using a probabilistic control strategy.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the autonomous vehicle 10, and generate control signals to the actuators 42 to automatically control the components of the autonomous vehicle 10 based on the logic, calculations, methods, and/or algorithms. Although a single controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the controller 34 are embodied in the system 11. The non-transitory computer readable storage device or media 46 includes machine-readable instructions (shown, for example, in FIG. 3), that when executed by the one or more processors, cause the processors 44 to execute the method 100 (FIG. 3).

The autonomous vehicle 10 may include one or more communication transceivers 37 in communication with the controller 34. Each of the communication transceivers 37 is configured to wirelessly communicate information to and from other remote entities, such as the remote vehicles, (through "V2V" communication), infrastructure (through "V2I" communication), remote systems at a remote call center (e.g., ON-STAR by GENERAL MOTORS), and/or personal electronic devices, such as a smart phone. The communication transceivers 37 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication transceivers 37 may include one or more antennas for receiving and/or transmitting signals, such as cooperative sensing messages (CSMs). The communication transceivers 37 may be considered sensors 40 and/or sources of data. The remote vehicles may include one or more communication transceivers 37 as described above with respect to the autonomous vehicle 10.

The autonomous vehicle 10 includes one or more actuators 42 in communication with the controller 34. The actuators 42 control one or more vehicle features such as, but not limited to, a propulsion system, a transmission system, a steering system, and a brake system. The vehicle features may further include interior and/or exterior vehicle features such as, but are not limited to, doors, a trunk, and cabin features such as air, music, lighting, etc.

The autonomous vehicle 10 also includes a vehicle body 12 and one or more wheels 50 coupled to the vehicle body 12. At least one of the wheels 50 is configured to turn relative to the vehicle body 12 to steer the autonomous vehicle 10. Each of the wheels 50 is surrounded by a tire 52. The tires 52 are configured to contact a road surface 60 of a road 62 to provide traction. The autonomous vehicle 10 has a center of gravity 68, a front axle 64, and a rear axle 66. The front axle 64 and the rear axle 66 are coupled to the vehicle body 12.

FIG. 3 is a flowchart of a method 100 for defensive autonomous driving that employs a probabilistic predictive control approach to plan for multiple potential uncertainties, emergencies, or other potential events along the road 62 ahead of the autonomous vehicle 10. As non-limiting examples, the potential events may be the sudden appearance of a potential obstacle in the road 62 (e.g., a teenage cyclist suddenly swerving toward the middle of the road 62), a sudden road friction drop due to, for example, an ice patch, and/or uncertain road angle or potential change in road angle.

The method 100 uses a data fusion approach to combine different information (e.g., data originating from a camera, lidar, etc.) to detect the potential emergency events. The probability of each potential emergency event is calculated based on the (time-varying) reliability of utilized information/signals as well as detection algorithms. The method 100 uses the detected potential emergency events and their probabilities to react earlier and plan a safe path to ensure vehicle stability and collision avoidance by simultaneously considering both presence and absence of emergency events. This strategy enables the path planner to prepare for the potential emergency events while respecting the desired path tracking objective as much as possible, thereby generating a robust and safe yet not overly conservative path.

The method 100 begins at block 102. At block 102, the controller 34 receives receiving road data. The road data includes information about the road 62 ahead of the autonomous vehicle 10 and may be at least partially received from the sensors 40 (e.g., lidar, camera, radar, etc.) of the autonomous vehicle 10. The road data may alternatively or additionally be received from crowdsourcing, remote vehicles, remote infrastructures, or other sources of information. Regardless of the source of the information, the road data includes information about one or more potential events along the road 62 ahead of the autonomous vehicle 10. Then, the method 100 continues to block 104.

At block 104, the controller 34 assesses the reliability of the sources of information based on the type (e.g., sensor type) of sources used and the detection methods used. For example, different sources of information (e.g., camera, lidar, etc.) may have lower or higher reliability based on existing environmental conditions around the autonomous vehicle 10. Similarly, the detection methods or detection algorithms (e.g., image processing, Fast Fourier transform (FFT), etc.) may have lower or higher reliability based on the information used and the detection method used. Then, the method 100 continues to block 106.

At block 106, for each detection method, the controller 34 may determine, in real time, the probability that the potential event in the road 62 ahead of the autonomous vehicle 10 may occur and the reliability of the detection method itself. The controller 34 fuses the sensor data of the plurality of sensors 40 (or other sources of information) to determine the probability that the plurality of potential events along the road 62 ahead of the autonomous vehicle 10 will occur. As a non-limiting example, the controller 34 may use the following equation to determine the probability that the plurality of potential events along the road 62 ahead of the autonomous vehicle will occur:

$$P_1 = \frac{(R_{1A}^c P_{1A} + R_{1B}^c P_{1B})}{R_{1A}^c + R_{1B}^c} \quad \text{Eq. 1}$$

where:
$P_1$ is the probability that a detected event of the plurality of potential events along the road 62 ahead of the autonomous vehicle will occur;
$R_{1A}$ is a reliability of a first sensor of the plurality of sensors 40;
$R_{1B}$ is a reliability of a second sensor of the plurality of sensors 40;
$P_{1A}$ is the probability that the detected event of the plurality of potential events along the road 62 ahead of the autonomous vehicle 10 will occur as detected by the first sensor;
$P_{1B}$ is the probability that the detected event of the plurality of potential events along the road 62 ahead of the autonomous vehicle 10 will occur as detected by the second sensor; and
c is a predetermined constant.

The method 100 then continues to block 108.

At block 108, the controller 34 may employ a prediction tree that considers nominal and emergency prediction branches (i.e., nominal and emergency events along the road 62 ahead of the autonomous vehicle 10) with their associated probabilities. As an example, the prediction tree may include probable tree emergency events. The probable emergency events are detected at each time step. The prediction tree includes nominal and emergency events branches with their associated probabilities. The emergency horizons are branched from the nodes/time steps the emergency event is predicted to occur through the prediction window. For example, some branches (yes and no branches) include a first probable event (e.g., a pop-up obstacle) within 10 meters from the vehicle 10 and the probability that the event will happen (e.g., 0.7). Other branches (yes and no branches) may correspond to a second probable event (e.g., ice patch) within 25 meters from the vehicle 10 and include the probabilities that the event will happen (e.g., 0.4). Other branches (yes and no branches) correspond to the third probable event (e.g., pop-up obstacle) within 40 meters from the vehicle 10 and the probability that the event will happen (e.g., 0.5). Further, the emergency horizons are branched from the nodes/time steps, and the emergency event is predicted to occur through the prediction window. Specifically, at block 108, the controller 34 determines, in real time, an adjusted planned path using a probabilistic predictive control that takes into account the probability that the plurality of potential events along the road 62 ahead of the autonomous vehicle 10 will occur. The probabilistic predictive control includes a vehicle prediction model and an optimizer. The prediction model is created using a planar bicycle model with two velocity states, lateral velocity, and yaw rate, and two position states, and heading deviation and lateral deviation. The desired longitudinal velocity of the autonomous vehicle 10 along the path is given, and a longitudinal controller is used to calculate the required drive/brake torque to follow the desired speed. Therefore, the longitudinal velocity of the autonomous vehicle 10 is considered to be known for the lateral controller. Using the small angle assumption for steering angle, the lateral dynamics of the autonomous vehicle 10 is described as:

$$\dot{v}_y = \frac{F_{yf} + F_{yr}}{m} - g(\cos(\theta_r)\sin(\phi_r) + \sin(\theta_r)\Delta\psi) - v_x r \quad \text{Eq. 2}$$

$$\dot{r} = \frac{l_f F_{yf} - l_r F_{yr}}{I_z} \quad \text{Eq. 3}$$

where:
m is the mass of the autonomous vehicle 10;
$I_z$ is the moment of inertia of the autonomous vehicle 10;
g is the gravitational acceleration;
$F_{yf}$ is the front lateral tire force;
$F_{yr}$ is the rear lateral tire force;
$l_f$ is the distance from the front axle 64 to the center of gravity 68 of the autonomous vehicle 10;
$l_r$ is the distance from the rear axle 66 to the center of gravity 68 of the autonomous vehicle 10;
$\theta_r$ is the road grade of the road 62;
$\phi_r$ is road bank of the road 62;
$\Delta\psi$ is heading deviation of the autonomous vehicle 10;
$v_y$ is the lateral velocity of the autonomous vehicle 10;
$v_x$ is the longitudinal velocity of the autonomous vehicle 10; and
r is the yaw rate of the autonomous vehicle 10.

In the prediction model of the MPC, the tire forces may be obtained using a brush tire model that captures the lateral force drop due to an applied longitudinal force. As a non-limiting example, the tire forces of the autonomous vehicle 10 may be obtained using the following equations:

$$F_y = \begin{cases} -C_\alpha \tan\alpha + \frac{c_\alpha^2}{3\xi\mu F_z}|\tan\alpha|\tan\alpha - \frac{c_\alpha^3}{27\xi^2\mu^2 F_z^2}\tan^3\alpha, & |\alpha| < \alpha_{sl} \\ -3\xi\mu F_z \text{sgn}\alpha, & |\alpha| \geq \alpha_{sl} \end{cases} \quad \text{Eq. 4}$$

$$\alpha_{sl} = \arctan\left(\frac{3\xi\mu F_z}{C_\alpha}\right) \quad \text{Eq. 5}$$

$$\xi = \sqrt{1 - \left(\frac{F_x}{\mu F_z}\right)^2} \quad \text{Eq. 6}$$

$$\alpha_f = \frac{v_y + l_r r}{v_x} - \delta \quad \text{Eq. 7}$$

where:
$C_\alpha$ is the tire cornering stiffness;
$F_z$ is the normal load on the tire 52;
$\alpha$ is the slip angle;
$\xi$ is a derating factor representing the remaining lateral force capacity based on the friction limit circle;
$F_x$ is the longitudinal force;

$\mu$ is the coefficient of friction between the road 62 and the tires 52;
$v_y$ is the lateral velocity of the autonomous vehicle 10;
$v_x$ is the longitudinal velocity of the autonomous vehicle 10;
r is the yaw rate of the autonomous vehicle 10;
$\delta$ is the steering angle of the autonomous vehicle 10;
$l_f$ is the distance from the front axle 64 to the center of gravity 68 of the autonomous vehicle 10;
$l_r$ is the distance from the rear axle 66 to the center of gravity 68 of the autonomous vehicle 10;
$\alpha_f$ is the slip angle of the front tires 52;
$\alpha_r$ is the slip angle of the rear tires 52; and
$F_y$ is the lateral force of the tires 52.

The nonlinear tire force of the rear axle is linearized at each time step around the operating point. Also, the front lateral force is considered as the control input instead of the steering angle, and then is mapped to steering angle of the autonomous vehicle 10. Finally, the lateral dynamics of the vehicle may be written as affine functions of the velocity states and the tire forces. To do so, the controller 34 may use the following equations:

$$\dot{v}_y = \frac{F_{yf} + \overline{F}_{yr} + \overline{C}_{\alpha_r}(\alpha_r - \overline{\alpha}_r)}{m} - g\sin(\phi_r)\cos(\theta_r) - v_x r \quad \text{Eq. 8}$$

$$\dot{r} = \frac{l_f F_{yf} - l_t(\overline{F}_{yr} + \overline{C}_{\alpha_r}(\alpha_r - \overline{\alpha}_r))}{I_z} \quad \text{Eq. 9}$$

$$\Delta\dot{\psi} = r - u\kappa(s)\cos(\phi_r)\cos(\theta_r) \quad \text{Eq. 10}$$

$$\dot{e} = v\Delta\psi + v \quad \text{Eq. 11}$$

where:
$\overline{F}_{yr}$ is the lateral force on the rear axle 66 at the current time;
$\overline{\alpha}_r$ is the rear slip angle at the current time;
$\overline{C}_{\alpha_r}$ is the corning stiffness at the current time;
$\Delta\psi$ is the heading deviation;
e is the lateral deviation;
$l_f$ is the distance from the front axle 64 to the center of gravity 68 of the autonomous vehicle 10;
$l_r$ is the distance from the rear axle 66 to the center of gravity 68 of the autonomous vehicle 10;
$\theta_r$ is the road grade of the road 62;
$\phi_r$ is road bank of the road 62;
$\Delta\psi$ is heading deviation of the autonomous vehicle 10;
u is an input;
$v_y$ is the lateral velocity of the autonomous vehicle 10;
$v_x$ is the longitudinal velocity of the autonomous vehicle 10; and
r is the yaw rate of the autonomous vehicle 10.

The position states of heading deviation and lateral deviation are local to a path with a given curvature, road grade, and the road bank. The resulting continuous-time vehicle model containing the vehicle dynamics and position states may be expressed as:

$$\dot{x} = A_c x + B_c u + d_c \quad \text{Eq. 12}$$

$$x = [v_y \quad r \quad \Delta\psi \quad e] \quad \text{Eq. 13}$$

$$u = F_{yf} \quad \text{Eq. 14}$$

-continued $$A_c = \begin{bmatrix} \frac{\bar{C}_{\alpha_r}}{mv_x} & \frac{-l_r\bar{C}_{\alpha_r}}{mv_x} - v_x & -g\sin(\theta_r) & 0 \\ -\frac{l_r\bar{C}_{\alpha_r}}{I_z v_x} & \frac{l_r^2\bar{C}_{\alpha_r}}{I_z v_x} & 0 & 0 \\ 0 & 1 & 0 & 0 \\ 1 & 0 & v_x & 0 \end{bmatrix}$$

$$B_c = \begin{bmatrix} \frac{1}{m} \\ \frac{l_f}{I_z} \\ 0 \\ 0 \end{bmatrix}$$ Eq. 15

$$d_c = \begin{bmatrix} \frac{\bar{F}_{yr} - \bar{c}_{\alpha_r}\bar{\alpha}_r}{m} - g\sin(\phi_r)\cos(\theta_r) \\ -\frac{l_r(\bar{F}_{yr} - \bar{c}_{\alpha_r}\bar{\alpha}_r)}{I_z} \\ -v_x\kappa(s)\cos(\phi_r)\cos(\theta_r) \\ 0 \end{bmatrix}$$ Eq. 16 where:
x is the positions states;
$v_y$ is the lateral velocity of the autonomous vehicle 10;
r is the yaw rate of the autonomous vehicle 10;
$\Delta\psi$ is the heading deviation of the autonomous vehicle 10
e is the lateral deviation of the autonomous vehicle 10
$F_{yf}$ is the front lateral force of the of the autonomous vehicle 10;
$\bar{F}_{yr}$ is the lateral force on the rear axle 66 at the current time;
$\bar{\alpha}_r$ is the rear slip angle at the current time;
$\bar{C}_{\alpha_r}$ is the corning stiffness at the current time;
$\Delta\psi$ is the heading deviation;
$l_f$ is the distance from the front axle 64 to the center of gravity 68 of the autonomous vehicle 10;
$l_r$ is the distance from the rear axle 66 to the center of gravity 68 of the autonomous vehicle 10;
$\theta_r$ is the road grade of the road 62;
$\phi r$ is road bank of the road 62;
$\kappa(s)$ is the given curvature;
$A_c$ is the system matrix;
$B_c$ is the control input matrix; and
$d_c$ is the disturbance term.

The continuous-time model is discretized as:

$$x(k+1) = A^k x(k) + B^k u(k) + d^k$$ Eq. 17 where:
x are the positions states;
k is a time stamp;
$A^k$ is the discretized state-space matrix A;
$B^k$ is the discretized state-space matrix B;
u is an input;
$d^k$ is the discretized state-space matrix d.

Assuming three probable emergency events in the prediction window, the system model is extended to include all the prediction horizons as below:

$$x(k+1) = \begin{bmatrix} x_{n,n,n}(k+1) \\ x_{n,n,e}(k+1) \\ \vdots \\ x_{e,e,e}(k+1) \end{bmatrix} =$$ Eq. 18

$$\begin{bmatrix} A^k_{n,n,n} & 0 & 0 & 0 \\ 0 & A^k_{n,n,e} & 0 & 0 \\ 0 & 0 & \ddots & 0 \\ 0 & 0 & 0 & A^k_{e,e,e} \end{bmatrix} \begin{bmatrix} x_{n,n,n}(k) \\ x_{n,n,e}(k) \\ \vdots \\ x_{e,e,e}(k) \end{bmatrix} + \begin{bmatrix} B^k_{n,n,n} & 0 & 0 & 0 \\ 0 & B^k_{n,n,e} & 0 & 0 \\ 0 & 0 & \ddots & 0 \\ 0 & 0 & 0 & B^k_{e,e,e} \end{bmatrix}$$

$$\begin{bmatrix} u_{n,n,n}(k) \\ u_{n,n,e}(k) \\ \vdots \\ u_{e,e,e}(k) \end{bmatrix} + \begin{bmatrix} C^k_{n,n,n} & 0 & 0 & 0 \\ 0 & C^k_{n,n,e} & 0 & 0 \\ 0 & 0 & \ddots & 0 \\ 0 & 0 & 0 & C^k_{e,e,e} \end{bmatrix} \begin{bmatrix} u_{n,n,n}(k+1) \\ u_{n,n,e}(k+1) \\ \vdots \\ u_{e,e,e}(k+1) \end{bmatrix} + \begin{bmatrix} d_{n,n,n}(k) \\ d_{n,n,e}(k) \\ \vdots \\ d_{e,e,e}(k) \end{bmatrix}$$

x are the positions states;
k is a time stamp;
$A^k$ is the discretized state-space matrix A;
$B^k$ is the discretized state-space matrix B;
u is an input;
C is the tire cornering stiffness;
$d^k$ is the discretized state-space matrix d;
n is a nominal event; and
e is an emergency event.

As discussed above, the probabilistic predictive control includes an optimizer to optimize the control actions. Thus, the MPC is configured to the determine the control actions to follow an adjusted planned path for the autonomous vehicle 10. This adjusted planned path considers the probability that the detected potential events will occur along the road 62 ahead of the autonomous vehicle 10. The optimizer uses an objective function to optimize the control actions of the autonomous vehicle 10 as follows:

$$J_c = \begin{bmatrix} x^k_{n,n,n} \\ x^k_{n,n,c} \\ \vdots \\ x^k_{c,c,c} \end{bmatrix}^T \begin{bmatrix} p^{n,n,n}Q^{n,n,n} & 0 & 0 & 0 \\ 0 & p^{n,n,c}Q^{n,n,c} & 0 & 0 \\ 0 & 0 & \ddots & 0 \\ 0 & 0 & 0 & p^{c,c,c}Q^{c,c,c} \end{bmatrix} \begin{bmatrix} x^k_{n,n,n} \\ x^k_{n,n,c} \\ \vdots \\ x^k_{c,c,c} \end{bmatrix}$$ Eq. 19

$$\sum_{k=1}^{N} + \begin{bmatrix} \Delta u^k_{n,n,n} \\ \Delta u^k_{n,n,c} \\ \vdots \\ \Delta u^k_{c,c,c} \end{bmatrix}^T \begin{bmatrix} p^{n,n,n}M^{n,n,n} & 0 & 0 & 0 \\ 0 & p^{n,n,c}M^{n,n,c} & 0 & 0 \\ 0 & 0 & \ddots & 0 \\ 0 & 0 & 0 & p^{c,c,c}M^{c,c,c} \end{bmatrix}$$

$$\begin{bmatrix} \Delta u^k_{n,n,n} \\ \Delta u^k_{n,n,c} \\ \vdots \\ \Delta u^k_{c,c,c} \end{bmatrix} + \begin{bmatrix} W^{n,n,n}_r & W^{n,n,c}_r & \cdots & W^{c,c,c}_r \end{bmatrix}$$

$$\begin{bmatrix} sr_{n,n,n}(k) \\ sr_{n,n,c}(k) \\ \vdots \\ sr_{c,c,c}(k) \end{bmatrix} + \begin{bmatrix} W^{n,n,n}_\beta & W^{n,n,c}_\beta & \cdots & W^{c,c,c}_\beta \end{bmatrix}$$

$$\begin{bmatrix} s\beta_{n,n,n}(k) \\ s\beta_{n,n,c}(k) \\ \vdots \\ s\beta_{c,c,c}(k) \end{bmatrix} + \begin{bmatrix} W^{n,n,n}_e & W^{n,n,c}_e & \cdots & W^{c,c,c}_e \end{bmatrix} \begin{bmatrix} se_{n,n,n}(k) \\ se_{n,n,c}(k) \\ \vdots \\ se_{c,c,c}(k) \end{bmatrix}$$

where:
$sr_{i,i,i}$ is a slack variable for yaw rate constraint for each prediction path;
$s\beta_{i,i,i}$ is a slack variable for sideslip constraint for each prediction path;
$se_{i,i,i}$ is a slack variable for lateral deviation constraint for each prediction path;

$p^{i,i,i}$ is the probability of each prediction path;
$Q^{i,i,i}$ is the tracking weight of each prediction path;
$M^{i,i,i}$ is the weight for proximity of control actions for each prediction path;
$W_r^{i,i,i}$ is the weight of slack variable for yaw rate constraint for each prediction path;
$W_\beta^{i,i,i}$ is the weight of slack variable for sideslip constraint for each prediction path; and
$W_e^{i,i,i}$ is the weight of slack variable for lateral deviation constraint for each prediction path;
u is an input;
x are the positions states;
k is a time stamp; and
$J_c$ is a cost function.

As shown in the equation above, the objective function includes a tracking weight for each of a plurality of predicted paths. The tracking weight for each of the plurality of predicted paths is multiplied by the probability that the potential events will occur along the road 62 ahead of the autonomous vehicle 10. The optimizer is constrained at least by control action constraints, control action slew rate constraints, yaw rate stability constraints, sideslip stability constraints, and lateral deviations constraints. Then, the optimizer is used to determine the control actions that the autonomous vehicle 10 should take to follow the adjusted planning path that considers the probability that the potential events will occur along the road 62 ahead of the autonomous vehicle 10. The method 100 then proceeds to block 110.

At block 110, the controller 34 controls the autonomous vehicle 10 to cause the autonomous vehicle 10 to autonomously follow the adjusted planned path by using the control actions determined at block 108. Thus, the controller 34 commands the actuators 42 to actuate in accordance with the control actions determined at block 108 to cause the autonomous vehicle 10 to autonomously follow the adjusted planned path.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for controlling an autonomous vehicle, comprising
receiving road data, wherein the road data includes information about a road ahead of the autonomous vehicle and is at least partly received from a plurality of sensors of the autonomous vehicle, and the road data includes information about a plurality of potential events along the road ahead of the autonomous vehicle;
detecting the plurality of potential events along the road ahead of the autonomous vehicle using the plurality of sensors of the autonomous vehicle;

determining, in real time, a probability that the plurality of potential events along the road ahead of the autonomous vehicle will occur while the autonomous vehicle moves along the road, wherein the probability that the plurality of potential events along the road ahead of the autonomous vehicle will occur is a function of a reliability of each of the plurality of sensors that detected the plurality of potential events along the road ahead of the autonomous vehicle, wherein a probabilistic predictive control includes a vehicle prediction model and an optimizer, wherein the vehicle prediction model uses a planar bicycle model, wherein the optimizer uses an objective function to optimize a plurality of control actions, and wherein the optimizer is constrained by control action constraints, control action slew rate constraints, yaw rate stability constraints, sideslip stability constraints, and lateral deviations constraints;

determining, in real time, an adjusted planned path using the probabilistic predictive control that takes into account the probability that the plurality of potential events along the road ahead of the autonomous vehicle will occur;

determining the plurality of control actions using the probabilistic predictive control; and controlling the autonomous vehicle to cause the autonomous vehicle to autonomously follow the adjusted planned path using the plurality of control actions.

2. The method of claim 1, further comprising:

fusing sensor data of the plurality of sensors to determine the probability that the plurality of potential events along the road ahead of the autonomous vehicle will occur;

wherein the probability that the plurality of potential events along the road ahead of the autonomous vehicle will occur is determined using a following equation:

$$P_1 = \frac{(R_{1A}^c P_{1A} + R_{1B}^c P_{1B})}{R_{1A}^c + R_{1B}^c}$$

where:

$P_1$ is the probability that a detected event of the plurality of potential events along the road ahead of the autonomous vehicle will occur;

$R_{1A}$ is a reliability of a first sensor of the plurality of sensors;

$R_{1B}$ is a reliability of a second sensor of the plurality of sensors;

$P_{1A}$ is the probability that the detected event of the plurality of potential events along the road ahead of the autonomous vehicle will occur as detected by the first sensor;

$P_{1B}$ is the probability that the detected event of the plurality of potential events along the road ahead of the autonomous vehicle will occur as detected by the second sensor; and c is a predetermined constant.

3. The method of claim 1, wherein the objective function includes a tracking weight for each of a plurality of predicted paths, and the tracking weight for each of the plurality of predicted paths is multiplied by the probability that the plurality of potential events will occur along the road ahead of the autonomous vehicle.

4. A system for an autonomous vehicle, comprising:
a plurality of sensors;
a controller in communication with the plurality of sensors, wherein the controller is programmed to:

receive road data, wherein the road data includes information about a road ahead of the autonomous vehicle and is at least partly received from the plurality of sensors of the autonomous vehicle, and the road data includes information about a plurality of potential events along the road ahead of the autonomous vehicle;

detect the plurality of potential events along the road ahead of the autonomous vehicle using the plurality of sensors of the autonomous vehicle;

determine, in real time, a probability that the plurality of potential events along the road ahead of the autonomous vehicle will occur while the autonomous vehicle moves along the road, wherein the probability that the plurality of potential events along the road ahead of the autonomous vehicle will occur is a function of a reliability of each of the plurality of sensors that detected the plurality of potential events along the road ahead of the autonomous vehicle, wherein a probabilistic predictive control includes a vehicle prediction model and an optimizer, wherein the vehicle prediction model uses a planar bicycle model, wherein the optimizer uses an objective function to optimize a plurality of control actions, and wherein the optimizer is constrained by control action constraints, control action slew rate constraints, yaw rate stability constraints, sideslip stability constraints, and lateral deviations constraints;

determine, in real time, an adjusted planned path using the probabilistic predictive control that takes into account the probability that the plurality of potential events along the road ahead of the autonomous vehicle will occur;

determine the plurality of control actions using the probabilistic predictive control; and control the autonomous vehicle to cause the autonomous vehicle to autonomously follow the adjusted planned path using the plurality of control actions.

5. The system of claim 4, wherein the controller is programmed to:

fuse sensor data of the plurality of sensors to determine the probability that the plurality of potential events along the road ahead of the autonomous vehicle will occur;

wherein the probability that the plurality of potential events along the road ahead of the autonomous vehicle will occur is determined using a following equation:

$$P_1 = \frac{(R_{1A}^c P_{1A} + R_{1B}^c P_{1B})}{R_{1A}^c + R_{1B}^c}$$

where:

$P_1$ is the probability that a detected event of the plurality of potential events along the road ahead of the autonomous vehicle will occur;

$R_{1A}$ is a reliability of a first sensor of the plurality of sensors;

$R_{1B}$ is a reliability of a second sensor of the plurality of sensors;

$P_{1A}$ is the probability that the detected event of the plurality of potential events along the road ahead of the autonomous vehicle will occur as detected by the first sensor;

$P_{1B}$ is the probability that the detected event of the plurality of potential events along the road ahead of the autonomous vehicle will occur as detected by the second sensor; and c is a predetermined constant.

6. A tangible, non-transitory, machine-readable medium, comprising machine-readable instructions, that when executed by a processor, cause the processor to:

receive road data, wherein the road data includes information about a road ahead of an autonomous vehicle and is at least partly received from a plurality of sensors of the autonomous vehicle, and the road data includes information about a plurality of potential events along the road ahead of the autonomous vehicle;

determine, in real time, a probability that the plurality of potential events along the road ahead of the autonomous vehicle will occur while the autonomous vehicle moves along the road;

determine, in real time, an adjusted planned path using a probabilistic predictive control that takes into account the probability that the plurality of potential events along the road ahead of the autonomous vehicle will occur, wherein the probabilistic predictive control includes a vehicle prediction model and an optimizer, wherein the vehicle prediction model uses a planar bicycle model, wherein the optimizer uses an objective function to optimize a plurality of control actions, and wherein the optimizer is constrained by control action constraints, control action slew rate constraints, yaw rate stability constraints, sideslip stability constraints, and lateral deviations constraints; and control the autonomous vehicle to cause the autonomous vehicle to autonomously follow the adjusted planned path.

7. The tangible, non-transitory, machine-readable medium of claim 6, wherein the tangible, non-transitory, machine-readable medium further comprises machine-readable instructions, that when executed by the processor, causes the processor to:

detect the plurality of potential events along the road ahead of the autonomous vehicle using the plurality of sensors of the autonomous vehicle;

wherein the probability that the plurality of potential events along the road ahead of the autonomous vehicle will occur is a function of a reliability of each of the plurality of sensors that detected the plurality of potential events along the road ahead of the autonomous vehicle.

8. The tangible, non-transitory, machine-readable medium of claim 7, wherein the tangible, non-transitory, machine-readable medium further comprises machine-readable instructions, that when executed by the processor, causes the processor to:

determine the plurality of control actions using the probabilistic predictive control to follow the adjusted planned path of the autonomous vehicle; and command the autonomous vehicle to perform the control actions to follow the adjusted planned path of the autonomous vehicle.

9. The tangible, non-transitory, machine-readable medium of claim 8, wherein the tangible, non-transitory, machine-readable medium further comprises machine-readable instructions, that when executed by the processor, causes the processor to:

fuse sensor data of the plurality of sensors to determine the probability that the plurality of potential events along the road ahead of the autonomous vehicle will occur;

wherein the probability that the plurality of potential events along the road ahead of the autonomous vehicle will occur is determined using a following equation:

$$P_1 = \frac{(R_{1A}^c P_{1A} + R_{1B}^c P_{1B})}{R_{1A}^c + R_{1B}^c}$$

where:

$P_1$ is the probability that a detected event of the plurality of potential events along the road ahead of the autonomous vehicle will occur;

$R_{1A}$ is a reliability of a first sensor of the plurality of sensors;

$R_{1B}$ is a reliability of a second sensor of the plurality of sensors;

$P_{1A}$ is the probability that the detected event of the plurality of potential events along the road ahead of the autonomous vehicle will occur as detected by the first sensor;

$P_{1B}$ is the probability that the detected event of the plurality of potential events along the road ahead of the autonomous vehicle will occur as detected by the second sensor; and c is a predetermined constant.

10. The tangible, non-transitory, machine-readable medium of claim 6, wherein the objective function includes a tracking weight for each of a plurality of predicted paths, and the tracking weight for each of the plurality of predicted paths is multiplied by the probability that the plurality of potential events will occur along the road ahead of the autonomous vehicle.

* * * * *